United States Patent Office 2,748,154
Patented May 29, 1956

2,748,154

PREPARATION OF CYANOHYDRINS

Glen E. Journeay, Texas City, Tex., assignor to Monsanto Chemical Company, St. Louis, Mo., a corporation of Delaware No Drawing. Application February 27, 1953,
Serial No. 339,449

11 Claims. (Cl. 260—465)

This invention relates to a process for the preparation of cyanohydrins and more particularly to the preparation of ketone and aldehyde cyanohydrins.

It is one of the objects of the invention to provide a new and improved process for the production of cyanohydrins.

Another object is to provide a new and improved process for the preparation of cyanohydrins from aldehydes and ketones and hydrocyanic acid in which side reactions are minimized and the cyanohydrin product is obtained in high yield and in a state of high purity.

A further object of the invention is to provide improved and novel catalysts for the liquid phase reaction of aliphatic ketones or aldehydes with hydrocyanic acid to form cyanohydrins.

These and other objects of the invention will be apparent from the following description of the invention.

It is well known that hydrocyanic acid reacts with aliphatic aldehydes and ketones to form the corresponding cyanonhydrins and that the reaction is accelerated by the presence of basic catalysts. Inorganic materials having a distinctly alkaline reaction in aqueous solutions such as oxides and hydroxides of the alkali or alkaline earth metals, alkali metal and alkaline earth metal salts such as carbonates or cyanides, ammonia, organic amines such as methyl, ethyl and the higher amines, and organic nitrogen bases such as pyridine and piperidine have all been proposed as catalysts. While all such catalysts are, in general, satisfactory, they all suffer from the same objectionable feature. In setting up the basicity required for catalyzing the reaction, they all likewise promote competing side reactions such as aldolization and polymerization which seriously and adversely affect not only the yield but also the quality of the cyanohydrin product. This is particularly true when the liquid phase reaction is conducted in a non-aqueous medium such as, for example, when the cyanohydrin itself is employed as a solvent medium.

It has now been discovered that such objectionable side reactions can virtually be eliminated and a more reproducible rate of reaction can be effected by employing as catalyst for the reaction a mixture of an aliphatic monocarboxylic acid and an alkali metal salt of said acid.

According to the invention, hydrocyanic acid and an aliphatic aldehyde or ketone are reacted together in the liquid phase in the presence of a small amount of a mixture of an aliphatic monocarboxylic acid and an alkali metal salt of said acid while employing the cyanohydrin to be produced as the solvent medium for the reaction.

The following examples further illustrate the invention:

Example I

A stock catalyst solution was prepared by weighing out approximately 0.05 mole (4.102 g.) of reagent-grade sodium acetate and 0.05 mole (3.0023 g.) of freshly distilled acetic acid, dissolving these two compounds in water, mixing them, and diluting the resulting solution to 100 ml. Solutions of hydrocyanic acid and acetaldehyde in acetaldehyde cyanohydrin were prepared by dissolving these compounds in the cyanohydrin. Approximately 1 ml. of the stock catalyst solution described above was added to 25 ml. of the HCN solution in a 100-ml. round-bottomed, glass-stoppered flask and 25 ml. of the acetaldehyde solution was then added to the mixture. Molar concentrations of reactants in the reaction mixture were about as follows: 0.9364 M acetaldehyde, 0.5890 M HCN, 0.0098 M sodium acetate, and 0.0098 M acetic acid. Temperature was maintained at approximately 25° C. and the reaction was conducted at essentially atmospheric pressure. After about 3.5 hours, there was no HCN remaining in the reaction mixture as evidenced by titration for free cyanide. A once-through yield of acetaldehyde cyanohydrin (lactonitrile) of 99% based on HCN was obtained. The product cyanohydrin was clear and water-white, indicating that it was of extremely high purity.

Example II

The procedure of Example I was followed for preparing the catalyst and mixing the reactants and catalyst except that a sealed flask was used for the reaction to prevent any losses by evaporation. Molar concentrations in the reaction mixture were as follows: 0.65 M of HCN, 0.69 M of acetaldehyde, 0.0098 M of sodium acetate, and 0.0098 M of acetic acid. Temperature in this case was maintained at about 40° C., while pressure was approximately atmospheric. After a 30-minute reaction period, no free HCN remained in the reaction mixture. The yield of acetaldehyde cyanohydrin obtained based on HCN was 99+%. The cyanohydrin product was clear and water-white and of excellent stability, since it underwent no discoloration as a result of 24-hr. storage at 40° C. in the presence of the catalyst.

Example III

Using the same technique described in Example I, a catalyst solution of sodium propionate (0.05 M) and propionic acid (0.05 M) is prepared. About 1 ml. of this catalyst mixture is used in the reaction between acetone and hydrocyanic acid following the procedure described in Example I at a temperature of 25° C. Yields of acetone cyanohydrin equivalent to the cyanohydrin yields in Examples I and II are obtained and the cyanohydrin is of comparable purity.

Example IV

A catalyst solution containing 0.5 M of potassium formate and 0.5 M of formic acid is prepared in the same manner as the catalyst described in Example I using equivalent weighed portions. About 0.2% by weight of this catalyst solution is added to 90 parts by weight of benzaldehyde cyanohydrin, which is employed as a solvent for the reaction, in a container provided with a stirring device. While the cyanohydrin is constantly agitated, 27 parts by weight of liquid hydrocyanic acid and 63.5 parts by weight of benzaldehyde are added in separate streams at such rates that the temperature in the reaction vessel is maintained at around 30–40° C. Small amounts of the catalyst solution are added continuously to maintain catalyst concentration at the initial level throughout the reaction period. The reaction is allowed to proceed after addition of the reactants for a period of about 2 hrs. When the reaction is complete, as evidenced by no further change in free cyanide in the reaction mixture (determined by titration), the crude product is acidified and distilled in vacuo. The yield of benzaldehyde cyanohydrin, based on HCN used, is approximately 99%.

The invention is not restricted to the exact procedures described in and illustrated by the preceding examples. Various modifications may be made without departing from the spirit and scope of the invention. If desired, for example, solvents other than the cyanohydrin to be prepared which have solvent action on the reactants and product and which do not react therewith may be employed; or, other solvents may be used in conjunction with the cyanohydrin, although there is no particular advantage to their use. The reaction medium should be kept substantially anhydrous. Small amounts of water may be used in preparing the catalyst mixture but the amount of water should be controlled so that it does not exceed about one per cent by weight of the reaction mixture.

While the reactants are preferably employed in equimolecular proportions, either or both of them may be added in excess. If an excess of either is used it is readily recoverable for re-use by known methods, such as distillation. The order of addition of reactants is not rigidly controlled. The catalyst may be added to the liquid solvent medium and the aldehyde or ketone and the hydrocyanic acid may be mixed and the mixture added to the catalyst-containing solvent, or the reactants may be added in separate streams. Or, if desired, the catalyst may be added to one of the two reactants and the reactants then added to the solvent medium in separate streams. In another alternate technique, the aldehyde or ketone and hydrocyanic acid may be separately dissolved in quantities of the reaction medium, the catalyst may be added to either of these solutions, and the two solutions mixed by flowing one into the other.

Acids suitable for employment in the catalyst mixture are the aliphatic monocarboxylic acids containing from 1 to 6 carbon atoms such as formic, acetic, propionic, butyric, etc. The alkali metal salts of such acids such as sodium formate, potassium acetate, sodium propionate, potassium butyrate, etc., constitute the other essential ingredient of the catalyst mixture. The ratio of salt to acid in the mixture may be varied from 90 mole per cent salt:10 mole per cent acid to 40 mole per cent salt:60 mole per cent acid. For optimum results, however, a catalyst composition of approximately equimolecular proportions is preferred. Only small amounts of the catalytic mixture are required. Amounts ranging from about 0.01%–5% by weight of the reaction mixture may be used. Preferably, catalyst concentration is maintained in the range from about 0.05–0.2% by weight of the reaction mixture.

The temperature of the reaction may be varied within reasonably wide limits. A preferable operating range is between 20–50° C., although optimum reaction rates and efficiency appear to be attained when the temperature is controlled to within the range of 30–40° C. Operation at atmospheric pressure is preferred but pressures above atmospheric may be used, provided the resultant elevated temperatures do not reach the point where any substantial decomposition of the cyanohydrin occurs.

The invention is generally well adapted for continuous operation and is applicable to the preparation of any of the aliphatic, aromatic, or aromatic-aliphatic cyanohydrins which may be maintained in the liquid state under suitable reaction conditions without undergoing substantial decomposition. For example, the invention may be employed to prepare the cyanohydrins of aldehydes such as formaldehyde, acetaldehyde, propionaldehyde, benzaldehyde, phenyl acetaldehyde and other higher alkyl, aryl, or aralkyl aldehydes and of ketones such as acetone, methyl ethyl ketone, diethyl ketone, isopropyl ketone, benzophenone, methyl benzyl ketone, and higher alkyl, aryl, or aralkyl or cyclic ketones, together with equivalents and homologues of the ketones and aldehydes.

What is claimed is:

1. A process for preparing a cyanohydrin which comprises reacting hydrocyanic acid and a compound of the group consisting of aldehydes and ketones, in the liquid phase, in a solvent medium, and in the presence of a catalyst comprising a mixture of an aliphatic monocarboxylic acid containing from 1 to 6 carbon atoms and an alkali metal salt of said acid.

2. A process for preparing a cyanohydrin which comprises reacting hydrocyanic acid and a compound of the group consisting of aldehydes and ketones, in the liquid phase employing said cyanohydrin as the reaction medium, and in the presence of a catalyst comprising a mixture of an aliphatic monocarboxylic acid containing from 1 to 6 carbon atoms and an alkali metal salt of said acid.

3. A process for preparing a cyanohydrin which comprises reacting, at a temperature of from about 20° C. to about 50° C., hydrocyanic acid and a compound of the group consisting of aldehydes and ketones, in the liquid phase employing said cyanohydrin as the reaction medium, and in the presence of a catalyst comprising a mixture of an aliphatic monocarboxylic acid containing from 1 to 6 carbon atoms and an alkali metal salt of said acid.

4. A process for preparing a cyanohydrin which comprises reacting, at a temperature of from about 30° C. to about 40° C., hydrocyanic acid and a compound of the group consisting of aldehydes and ketones, in the liquid phase employing said cyanohydrin as the reaction medium, and in the presence of a catalyst comprising an approximately equimolecular mixture of an aliphatic monocarboxylic acid containing from 1 to 6 carbon atoms and an alkali metal salt of said acid.

5. A process for preparing cyanohydrins which comprises reacting at a temperature of from 30° C. to about 40° C., hydrocyanic acid and a compound of the group consisting of aldehydes and ketones, in the liquid phase, employing said cyanohydrin as the reaction medium, and in the presence of a catalyst comprising an approximately equimolecular mixture of an aliphatic monocarboxylic acid containing from 1 to 6 carbon atoms and an alkali metal salt of said acid, said catalyst mixture being present in an amount approximately equal to from 0.01–5% by weight of the reaction mixture.

6. A process for preparing acetalydehyde cyanohydrin which comprises reacting, at a temperature of from about 20° C. to about 50° C., hydrocyanic acid and acetaldehyde in the liquid phase, in a solvent medium, and in the presence of a catalyst comprising a mixture of an aliphatic monocarboxylic acid containing from 1 to 6 carbon atoms and an alkali metal salt of said acid.

7. A process for preparing acetaldehyde cyanohydrin which comprises reacting, at a temperature of from about 30° C. to about 40° C., hydrocyanic acid and acetaldehyde dissolved in acetaldehyde cyanohydrin in the presence of a catalyst comprising an approximately equimolecular mixture of an aliphatic monocarboxylic acid containing from 1 to 6 carbon atoms and an alkali metal salt of said acid, said catalyst mixture being present in an amount approximately equal to 0.05–5% by weight of the reaction mixture.

8. A process for preparing acetaldehyde cyanohydrin which comprises reacting, at a temperature of from about 30° C. to about 40° C., hydrocyanic acid and acetaldehyde dissolved in acetaldehyde cyanohydrin in the presence of a catalyst comprising an approximately equimolecular mixture of acetic acid and sodium acetate, said catalyst mixture being present in an amount approximately equal to from 0.05 to 0.2% by weight of the reaction mixture.

9. A process for preparing acetaldehyde cyanohydrin which comprises reacting, at a temperature of from about 30° C. to about 40° C., hydrocyanic acid and acetaldehyde dissolved in acetaldehyde cyanohydrin in the presence of a catalyst comprising an approximately equimolecular mixture of acetic acid and potassium acetate, said catalyst mixture being present in an amount approximately equal to from 0.01% to 5% by weight of the reaction mixture.

10. A process for preparing acetone cyanohydrin which comprises reacting, at a temperature of from about 30° C. to about 40° C., hydrocyanic acid and acetone dissolved in acetone cyanohydrin in the presence of a catalyst comprising an approximately equimolecular mixture of sodium formate and formic acid, said catalyst mixture being present in an amount approximately equal to from 0.01–5% by weight of the reaction mixture.

11. A process for preparing benzaldehyde cyanohydrin which comprises reacting, at a temperature of from about 30° C. to about 40° C., hydrocyanic acid and benzaldehyde dissolved in benzaldehyde cyanohydrin in the presence of a catalyst comprising an approximately equimolecular mixture of sodium propionate and propionic acid, said catalyst being present in an amount approximately equal to from about 0.01–5% by weight of the reaction mixture.

References Cited in the file of this patent

UNITED STATES PATENTS

| | | |
|---|---|---|
| 1,984,415 | Macallum | Dec. 18, 1934 |
| 2,090,942 | Fick | Aug. 24, 1937 |
| 2,101,823 | Dittmar | Dec. 4, 1937 |
| 2,166,600 | Leupold et al. | July 18, 1939 |
| 2,175,805 | Jacobson | Oct. 10, 1939 |
| 2,623,896 | Beier | Dec. 30, 1952 |

FOREIGN PATENTS

| | | |
|---|---|---|
| 359,262 | Great Britain | Oct. 22, 1931 |
| 585,644 | Great Britain | Feb. 14, 1947 |